(12) United States Patent
Hu et al.

(10) Patent No.: US 12,003,896 B2
(45) Date of Patent: Jun. 4, 2024

(54) PROJECTION DISPLAY DEVICE

(71) Applicant: APPOTRONICS CORPORATION LIMITED, Guangdong (CN)

(72) Inventors: Fei Hu, Guangdong (CN); Chen Chen, Guangdong (CN); Xin Yu, Guangdong (CN); Zuqiang Guo, Guangdong (CN); Yi Li, Guangdong (CN)

(73) Assignee: APPOTRONICS CORPORATION LIMITED, Guangdong (CN)

(*) Notice: Subject to any disclaimer, the term of this patent is extended or adjusted under 35 U.S.C. 154(b) by 314 days.

(21) Appl. No.: 17/588,146

(22) Filed: Jan. 28, 2022

(65) Prior Publication Data
US 2022/0224869 A1  Jul. 14, 2022

Related U.S. Application Data

(63) Continuation-in-part of application No. PCT/CN2020/103562, filed on Jul. 22, 2020.

(30) Foreign Application Priority Data

Jul. 29, 2019  (CN) .......................... 201910691347.8

(51) Int. Cl.
*H04N 9/31* (2006.01)
*H04N 13/363* (2018.01)
*H04N 13/398* (2018.01)

(52) U.S. Cl.
CPC ......... *H04N 9/3155* (2013.01); *H04N 13/363* (2018.05); *H04N 13/398* (2018.05)

(58) Field of Classification Search
CPC .. H04N 9/3155; H04N 13/363; H04N 13/398; H04N 9/312; H04N 9/317; H04N 13/339
See application file for complete search history.

(56) References Cited

U.S. PATENT DOCUMENTS 10,025,174 B1 * 7/2018 Tait ...................... H04N 13/398
10,306,216 B2   5/2019 Ward
(Continued)

FOREIGN PATENT DOCUMENTS

CN   101371289 A   2/2009
CN   101398536 A   4/2009
(Continued)

OTHER PUBLICATIONS

International Search Report dated Oct. 27, 2020 for corresponding International Application No. PCT/CN2020/103562.
(Continued)

*Primary Examiner* — Farzana Hossain
(74) *Attorney, Agent, or Firm* — TAROLLI, SUNDHEIM, COVELL & TUMMINO L.L.P.

(57) ABSTRACT

Provided is a projection display device for displaying a time period of one frame of stereo image as a first modulation period. The projection display device includes: a light source for emitting illumination light; a spatial light modulator for modulating the illumination light according to a plurality of frames of two-dimensional images corresponding to a stereo image to be displayed, and sequentially emitting, within the first modulation period, image light corresponding to the plurality of frames of the two-dimensional images; an angle deflection apparatus arranged in an emergent optical path of the image light and used for deflecting the image light corresponding to the plurality of frames of two-dimensional images to different angles for emission; and a projection screen for displaying the image light deflected by the angle deflection apparatus.

12 Claims, 4 Drawing Sheets

(56) References Cited

U.S. PATENT DOCUMENTS

| | | | |
|---|---|---|---|
| 2018/0091803 A1 | 3/2018 | Ward et al. | |
| 2019/0369403 A1* | 12/2019 | Leister | G03H 1/268 |
| 2021/0092339 A1* | 3/2021 | Zhang | H04N 9/3194 |
| 2021/0405472 A1* | 12/2021 | Xue | G02F 1/134336 |

FOREIGN PATENT DOCUMENTS

| | | |
|---|---|---|
| CN | 201576164 U | 9/2010 |
| CN | 102016695 A | 4/2011 |
| CN | 102768460 A | 11/2012 |
| CN | 202975583 U | 6/2013 |

OTHER PUBLICATIONS

Chinese Office Action for Corresponding Application Serial No. 2019105913478, dated Sep. 16, 2022, pp. 1-14.

* cited by examiner

PROJECTION DISPLAY DEVICE

CROSS-REFERENCE TO RELATED APPLICATIONS

The present application is a Continuation-in-part of International application PCT/CN2020/103562, filed on Jul. 22, 2020, which claims priority to Chinese Patent Application No. 201910691347.8, filed on Jul. 29, 2019, the content of which is incorporated herein by reference in its entirety.

TECHNICAL FIELD

The present disclosure relates to the field of projection technologies, and in particular, to a projection display device.

BACKGROUND

This part is intended to provide background or context for specific implementations of the present disclosure in the claims. The description herein is not recognized as the prior art by virtue of inclusion in this part.

Generally, three-dimensional (3D) projection display depends on a high refresh rate of a projector, such that images at different angles can be projected in display time of one frame of stereo image. However, a sufficient refresh rate is required to display an image at each angle.

SUMMARY

The present disclosure provides a projection display device capable of effectively improving an image refresh rate (frame rate), to project a two-dimensional (2D) image from a plurality of angles to obtain a stereo image.

The present disclosure provides a projection display device, where a period in which one frame of stereo image is displayed is referred to as a first modulation cycle, and the projection display device includes:
 a light source, configured to emit illumination light;
 a spatial light modulator, configured to modulate the illumination light based on a plurality of frames of 2D images corresponding to a to-be-displayed stereo image, and sequentially emit, in the first modulation cycle, image light corresponding to the plurality of frames of 2D images;
 an angle deflection apparatus, disposed on an emergent optical path of the image light, and configured to deflect the image light corresponding to the plurality of frames of 2D images to different angles for emission; and
 a projection screen, configured to display the image light deflected by the angle deflection apparatus.

BRIEF DESCRIPTION OF THE DRAWINGS

To describe the technical solutions in the embodiments/implementations of the present disclosure more clearly, the following briefly describes the accompanying drawings required for describing the embodiments/implementations. Apparently, the accompanying drawings in the following description show merely some embodiments/implementations of the present disclosure, and a person of ordinary skill in the art may further derive other drawings from these accompanying drawings without creative efforts.

Figure 1:
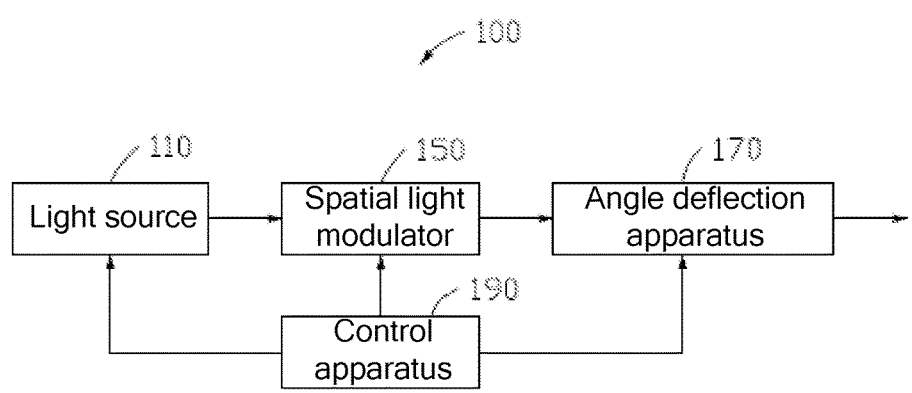
FIG. 1 is a schematic structural diagram of a projection display device according to the present disclosure.

| List of reference numerals | |
| --- | --- |
| Projection display device | 100 |
| Light source | 110 |
| Spatial light modulator | 150 |
| Angle deflection apparatus | 170 |
| Control apparatus | 190 |
| Image light | I, I1, I2, I3 |
| Guide array | W |
| Guide portion | W1, W2, W3 |

The present disclosure is further described in the following detailed description with reference to the accompanying drawings.

DETAILED DESCRIPTION

According to a pulse width modulation (PWM) method used for a traditional digital micro-mirror device (DMD), a frame rate for monochrome display with a bit depth of 8 is limited to about 180 Hz. If each frame of image is synthesized by three frames of images of different base colors, a frame rate of each frame of image is 60 Hz, in other words, 60 images of three base colors are refreshed every second, which is far from enough for multi-angle 3D projection display.

To make the objectives, features, and advantages of the present disclosure more comprehensible, the present disclosure is described in detail below with reference to the accompanying drawings and specific embodiments. It should be noted that without conflict, the embodiments of the present disclosure and features of the embodiments may be combined with each other.

Many specific details are set forth in the following description to facilitate a full understanding of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Unless otherwise defined, all technical and scientific terms used herein have the same meaning as commonly understood by those skilled in the technical field of the present disclosure. The terms used in the specification of the present disclosure herein are only for the purpose of describing specific embodiments, and are not intended to limit the present disclosure.

As shown in FIG. 1, the present disclosure provides a projection display device 100, which may be a projection display device for displaying a stereo image, such as a cinema projector, an engineering projector, a micro projector, or a laser television. The projection display device 100 includes a light source 110, a spatial light modulator 150, an angle deflection apparatus 170, a control apparatus 190, a projection lens (not shown in the figure), and a projection screen (not shown in the figure). The light source 110 is configured to emit illumination light. The spatial light modulator 150 is configured to modulate the illumination light based on a plurality of frames of 2D images corresponding to one frame of stereo image to obtain image light. The angle deflection apparatus 170 is configured to deflect image light corresponding to different frames of 2D images to different deflection angles. Image light emitted by the angle deflection apparatus 170 and transmitted at different deflection angles is projected onto the projection screen after passing through the projection lens. The projection screen is configured to receive image light with different deflection angles to display a stereo image.

In order to more clearly describe a projection display principle of the present disclosure, a period in which the projection display device 100 displays one frame of stereo image is referred to as a first modulation cycle, which is determined by a refresh rate of a 3D video. Under a same refresh rate, in order to present the 3D video, a plurality of frames of 2D images need to be modulated in time of modulating one frame of 2D image in a 2D video. The present disclosure divides the first modulation cycle determined based on the refresh rate into a plurality of second modulation cycles. The projection display device 100 reduces modulation time of a single frame of 2D image to emit image light corresponding to a 2D image in a shorter cycle (second modulation cycle), and then emits the image light of the plurality of frames of 2D images at different deflection angles in the first modulation cycle. The plurality of frames of 2D images transmitted in different directions are synthesized into one frame of stereo image to realize 3D display.

In one embodiment, the control apparatus 190 is configured to receive a video signal. The video signal is a stereo image signal. Each frame of stereo image signal includes a plurality of frames of 2D original image signals, and each frame of 2D original image signal corresponds to a 2D image with a projection angle. However, the projection angles corresponding to the 2D original image signals received by the control apparatus 190 may be inconsistent with a plurality of fixed projection angles provided by the projection display device 100. Therefore, after receiving the video signal, the control apparatus 190 first obtains corresponding stereo image data based on 2D original image data of the plurality of angles, splits the stereo image data to obtain a 2D image corresponding to a spatial angle that can be obtained by the angle deflection apparatus of the projection display device 100 through deflection, and transmits the obtained 2D image to the spatial light modulator 150.

The light source 110 may be a pure laser light source for emitting laser light as the illumination light. The light source 110 may include lasers of three base colors, such as red, green, and blue lasers, to emit the illumination light including the three base colors. In an implementation, the light source 110 is a hybrid laser and fluorescent light source, which includes an excitation light source and a wavelength conversion apparatus. The excitation light source includes an illuminant for emitting laser light as excitation light, and the excitation light is used to excite a wavelength conversion material on a surface of the wavelength conversion apparatus, so as to generate excited light with a different color from the excitation light. The excited light and some non-converted excitation light are emitted from the light source as the illumination light. In an implementation, the light source 110 emits illumination light of a variety of base colors by timing, for example, emits red illumination light, green illumination light, and blue illumination light by timing. In an embodiment, the light source may alternatively be an LED light source.

In a first implementation of the present disclosure, the control apparatus 190 is configured to send a light source control signal, and the light source 110 is configured to emit the illumination light based on the light source control signal. The first modulation cycle includes a plurality of second modulation cycles, and the spatial light modulator 150 is configured to emit, in each second modulation cycle, image light corresponding to one frame of 2D image. Compared with a traditional projection display device for projecting a 2D image, a projection display device for displaying a stereo image needs to obtain more image frames through modulation in preset display time of one frame of image, in other words, the projection display device needs to have a higher image refresh rate. The control apparatus 190 controls, in each second modulation cycle, non-constant illumination light emitted by the light source 110, and controls a time length corresponding to an LSB of the spatial light modulator 150 in the second modulation cycle, to achieve shorter modulation time under joint action of the brightness-varying light source and a modulation mechanism of the spatial light modulator, while ensuring image quality of a modulated 2D image (meeting a bit depth requirement). In other words, the spatial light modulator can obtain, through modulation in the second modulation cycle, a brightness set or grayscale set meeting the bit depth requirement.

We know that a computer uses a counting unit referred to as a "bit" to record data representing a color, so as to display the color. For an image with a display bit depth of 8, a minimum grayscale value is 0, and a maximum grayscale value is $2^8-1=255$. There are 254 grayscale states between the minimum grayscale value and the maximum grayscale value, and each grayscale state corresponds to a different grayscale value.

A bit depth is a quantity of bits required by the computer to represent grayscale information of a pixel in a grayscale image. When the bit depth is larger, namely, more bits are required, there is a smaller difference between adjacent grayscale values, numerical sampling of simulation information is less obvious, grayscale difference transition in the image is more natural and smoother, and an image contrast is greater. Therefore, the image with the display bit depth of 8 can have $2^8=256$ grayscale values.

Assuming that a bit depth of a 2D image emitted by a projection device is 8 as required, the spatial light modulator is required to be able to emit $2^8=256$ grayscale states (illumination brightness) in the second modulation cycle.

The light source control signal can be used to change the light brightness of the corresponding illuminant in the light source 110 by adjusting a driving current or driving voltage of the light source 110. Generally, brightness of the illumination light increases with an increase of the driving current/driving voltage of the light source 110. However, the illuminant is more likely to be damaged if it is continuously driven for a long time at a driving current/driving voltage exceeding a rated current/rated voltage.

Generally, when the light source is continuously driven at its rated current, the light brightness is rated brightness of the light source. In an existing projection device, the spatial light modulator adopts a PWM modulation method, and the light source works in a continuous driving mode, in other words, the light source emits illumination light with constant brightness to the spatial light modulator. The driving current of the light source is its rated current, and the brightness of the illumination light is the rated brightness of the light source. In the present disclosure, the brightness of the illumination light is varying. Specifically, the second modulation cycle includes a low-brightness period and a high-brightness period. Illumination brightness in the low-brightness period is first-level brightness, and illumination brightness in the high-brightness period is second-level brightness. The first-level brightness and the second-level brightness may be constant values, or may be brightness ranges, in other words, the illumination brightness in the low-brightness period includes a plurality of brightness values, and the illumination brightness in the high-brightness period includes a plurality of brightness values. When the first-level brightness and the second-level brightness are the constant values, the constant value corresponding to the first-level brightness is less than the constant value corresponding to the second-level brightness. When the first-level brightness and the second-level brightness are the brightness ranges, any brightness of the first-level brightness is less than any brightness of the second-level brightness; or the light brightness of the light source when the light source is continuously driven at its rated current is the rated brightness, any brightness of the first-level brightness is less than the rated brightness, any brightness of the second-level brightness is not less than the rated brightness, and a difference value between the average brightness of the first-level brightness and the second-level brightness (i.e., a value obtained by dividing a sum of the first-level brightness and the second-level brightness by 2) and the rated brightness is less than a specified threshold.

In each second modulation cycle, the spatial light modulator 150 is configured to modulate the illumination light based on a 2D image corresponding to each spatial angle, to obtain image light corresponding to each 2D image. In the present disclosure, an example in which the spatial light modulator 150 is a DMD is used for description. The DMD is provided with a modulation area for receiving and modulating the illumination light, and the modulation area is provided with modulation units arranged in pixels. Each modulation unit is specifically a reflective micromirror, and each reflective micromirror may be in an "ON" state or "OFF" state. When the reflective micromirror is in the "ON" state, the reflective micromirror is used to reflect an illumination beam to the angle deflection apparatus 170, such that the illumination beam can be emitted from the projection lens and displayed on the projection screen. When the reflective micromirror is in the "OFF" state, the reflective micromirror is used to reflect an illumination beam to the outside of the angle deflection apparatus 170, such that the illumination beam does not enter the projection lens, and is not emitted from the projection display device 100. A light ray emitted by one reflective micromirror corresponds to one pixel in a to-be-displayed image.

Figure 2:
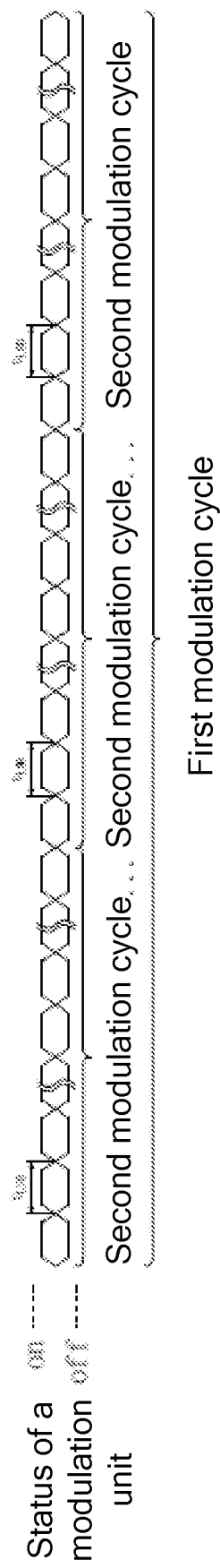
FIG. 2 is a principle diagram related to a second modulation cycle.

The LSB is a minimum grayscale unit that can be realized by the spatial light modulator. In the present disclosure, the LSB corresponds to a time length corresponding to a minimum brightness unit that can be modulated by the spatial light modulator in an illumination time sequence. In the present disclosure, the second modulation cycle includes a plurality of LSBs, and a sum of time lengths corresponding to the plurality of LSBs constitutes the second modulation cycle. The time length corresponding to the LSB corresponds to one reversal cycle of the modulation unit, which is denoted as a response time length $t_{LSB}$, as shown in FIG. 2.

It should be noted that, during 3D video playback, a playback frame rate is preset or specified based on an actual demand, in other words, time corresponding to the first modulation cycle is determined, and a quantity of 2D images obtained through parsing by the control apparatus based on the stereo image data is determined based on an actually specified algorithm. Therefore, when the first modulation cycle is determined, time corresponding to the second modulation cycle is also determined. For example, if the frame rate is 60 Hz, modulation time of one frame of stereo image, namely, the time length corresponding to the first modulation cycle, is: time corresponding to each color (namely, 1)/60 Hz≈16.67 ms. If the control apparatus can split one frame of stereo image into three 2D images based on the algorithm, the time length corresponding to the second modulation cycle is 16.67/3≈5.56 ms.

In the present disclosure, the control apparatus 190 can obtain a specified grayscale state set through modulation in the second modulation cycle by controlling the reversal cycle of the modulation unit of the spatial light modulator 150 in the determined second modulation cycle, namely $t_{LSB}$, and controlling a brightness change of the illumination light emitted by the light source.

Assuming that it is necessary to display the 2D image split from the stereo image as an image with a bit depth of 5, if a traditional binary PWM timing modulation method with constant illumination light is used to display the image with the bit depth of 5, 5 bit planes corresponding to different bit orders need to be obtained through division. A weight corresponding to a bit plane of a lowest bit order is $2^0$, which corresponds to time corresponding to one LSB. Weights corresponding to bit planes of other bit orders are $2^1$, $2^2$, $2^3$, and $2^4$ respectively. Time corresponding to a bit plane of a highest bit order is time corresponding to $2^4$=16 LSBs. If image data of a pixel is binary 01111, the DMD is OFF in the time corresponding to the bit plane of the highest bit order, and is on in time corresponding to other bit planes. If image data of a pixel is 11010, the DMD is OFF in bit planes whose weights are $2^0$ and $2^2$ respectively, and is on in other bit planes. According to the above rules, the DMD can obtain 32 grayscale states through modulation in time corresponding to the 5 bit planes, in other words, can display the image with the bit depth of 5. Minimum time required to realize an image with the bit depth of 5 by using the binary PWM timing modulation method with constant illumination light is time corresponding to 31 LSBs. Therefore, when the bit depth of the 2D image is i, a time length required for modulating one frame of 2D image in a PWM modulation mode is: $(2^i-1)*t_{LSB}$. However, the time length cannot meet the time of the second modulation cycle during 3D video display. That is, when a frame rate of a to-be-displayed 3D video is high, the traditional PWM timing modulation method is unable to display a 2D image with a high bit depth in a short time.

The present disclosure realizes image display with a higher bit depth in a shorter time by adjusting the time length corresponding to the LSB, the brightness of the illumination light in time corresponding to each LSB and the ON or OFF state of modulation unit.

Figure 3:
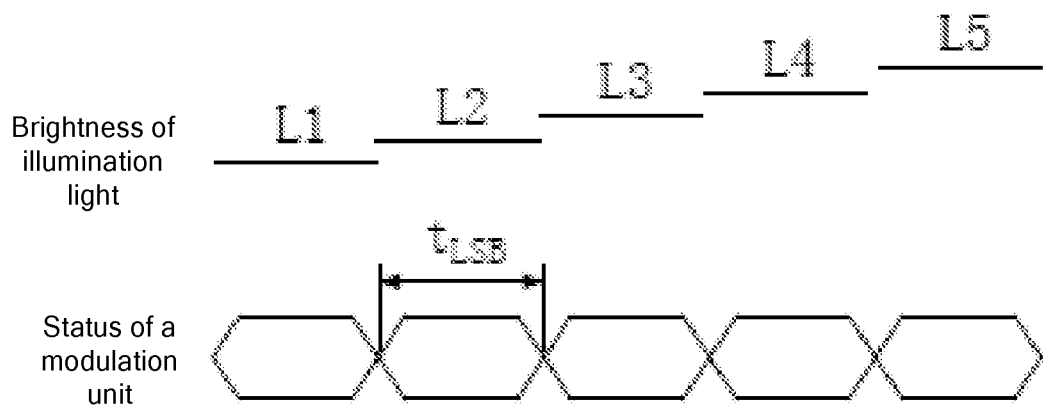
FIG. 3 is a principle diagram of a correspondence between illumination brightness and an LSB in a second modulation cycle according to an embodiment of the present disclosure.

As shown in FIG. 3, to display the image with the bit depth of 5, time corresponding to at least 5 LSBs is required, and corresponding time of each LSB corresponds to different brightness of the illumination light. A switch of a single lens in the time corresponding to the 5 LSBs is controlled to realize 32 illumination brightness values, namely, 32 grayscale states, which are 0, L1, L2, L3, L4, L5, L1+L2, L1+L3, L1+L4, L1+L5, L1+L2+L3, L1+L2+L4, L1+L2+L5, L1+L3+L4, L1+L3+L5, L1+L4+L5, L1+L2+L3+L4, L1+L2+L3+L5, L1+L2+L4+L5, L1+L3+L4+L5, L1+L2+L3+L4+L5, L2+L3, L2+L4, L2+L5, L2+L3+L4, L2+L3+L5, L2+L4+L5, L2+L3+L4+L5, L3+L4, L3+L5, L3+L4+L5, L4+L5.

Certainly, during actual display, a quantity of LSBs included in the second cycle, namely, a time length corresponding to each LSB, may be adjusted based on an actual time length of the second modulation cycle and a bit depth of a to-be-displayed 2D image, and a time length corresponding to one or more LSBs can be set to correspond to one illumination brightness value. A time length corresponding to each illumination brightness value may be the same or different.

In the present disclosure, in each second modulation cycle, namely, in display time of each frame of 2D image, the brightness of the illumination light is not constant, in other words, the brightness in the low-brightness period and the brightness in the high-brightness period in the second modulation cycle are different. Compared with the PWM modulation mode, the present disclosure is advantageous for each modulation unit to emit illumination light conforming to a light amount corresponding to a pixel grayscale to the angle deflection apparatus 170 in a relatively short time length, so as to help the projection display device 100 to reduce the time length of the second modulation cycle. More second modulation cycles may be specified in the fixed first modulation cycle, that is, in display time of one frame of stereo image, the projection display device provided in the present disclosure is conducive to emitting image light corresponding to more frames of 2D images. After angle polarization, these frames of 2D images can be synthesized into one frame of stereo image, so as to display the stereo image.

In an embodiment, in the second modulation cycle, the time length corresponding to the LSB and the brightness of the illumination light are adjusted to make the time length of the one or more LSBs correspond to one brightness value of the illuminating light, such that a 2D image with a specified bit depth can be obtained through modulation in the second modulation cycle, and it is also necessary to ensure that average brightness of the illumination light in the second modulation cycle is not less than a specified threshold to ensure that an image obtained through modulation meets a brightness requirement. For example, in the second modulation cycle, rated brightness of the varying illumination light is close to the rated brightness of the light source under the rated current, or in the second modulation cycle, a ratio of the average brightness of the varying illumination light to the rated brightness is 0.8 to 1.2.

In an implementation, the second modulation cycle includes the low-brightness period and the high-brightness period. Average brightness of the high-brightness period is greater than the rated brightness, average brightness of the low-brightness period is less than the rated brightness, and a ratio of overall average brightness of the high-brightness period and the low-brightness period to the rated brightness is 0.8 to 1.2.

Figure 4:
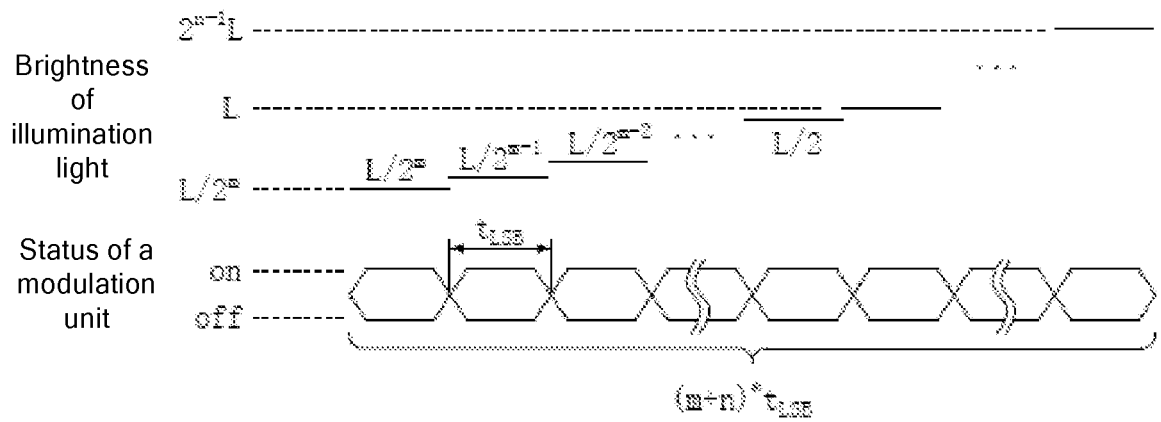
FIG. 4 is a principle diagram of a correspondence between illumination brightness and an LSB in a second modulation cycle according to another embodiment of the present disclosure.

In a specific embodiment, as shown in FIG. 4, the horizontal axis in FIG. 4 represents time, and a length of the horizontal axis in the figure is one second modulation cycle, including (m+n) response time lengths $t_{LSB}$, where m response time lengths correspond to m lowest-brightness sub-periods, namely, a first lowest-brightness sub-period, a second lowest-brightness sub-period, . . . , and an $m^{th}$ lowest-brightness sub-period, and n response time lengths correspond to n highest-brightness sub-periods, namely, a first highest-brightness sub-period, a second highest-brightness sub-period, . . . , and an $n^{th}$ lowest-brightness sub-period. The vertical axis in FIG. 4 represents the brightness of the illumination light. In each second modulation cycle, the brightness of the illumination light is lowest in the first lowest-brightness sub-period, highest in the $n^{th}$ highest-brightness sub-period, and constant in each sub-period. The brightness of the illumination light increases stepwise from low to high in different sub-periods, or more specifically, brightness changes of the illumination light in different sub-periods are exponential. In this implementation, brightness of the illumination light in each lowest-brightness sub-period meets the following formula: $L_{1i}=L/2^{m+1-i}$, where $1 \le i \le m$, i is an integer, $L_{1i}$, represents brightness of the illumination light in an $i^{th}$ lowest-brightness sub-period, and L represents the rated brightness emitted by the light source at the rated current; and brightness of the illumination light in each highest-brightness sub-period meets the following formula: $L_{2j}=L*2^{j-1}$, where $1 \le j \le n$, j is an integer, $L_{2j}$ represents brightness of the illumination light in a $j^{th}$ highest-brightness sub-period, and L represents rated brightness emitted by the light source at the rated voltage.

As shown in FIG. 4, the brightness of the illumination light in the first lowest-brightness sub-period is $L/2^m$, and brightness of the illumination light in a subsequent sub-period is twice brightness of a previous sub-period. In other words, brightness values of the illumination light in the plurality of lowest-brightness sub-periods are $L/2^m$, $L/2^{m-1}$, $L/2^{m-2}$, . . . , and $L/2$ respectively, and brightness values of the illumination light in the plurality of highest-brightness sub-periods are L, $L*2$, . . . , and $L*2^{n-1}$ respectively. $L/2^m$ is lowest brightness that can be achieved for the illumination light in a pulse state. An amount of light emitted by one modulation unit of the spatial light modulator 150 in the first lowest-brightness sub-period (light brightness multiplied by a time length of the first lowest-brightness sub-period) corresponds to a grayscale value that can be obtained by the spatial light modulator 150 through modulation when the LSB is 1, which is also a difference between amounts of light corresponding to adjacent grayscale values. $L*2^{n-1}$ is highest brightness that can be achieved by the light source 110 in the pulse state. In the second modulation cycle, a total amount of light emitted by each modulation unit corresponds to a grayscale value of the modulation unit. In this implementation, the brightness of the illumination light changes exponentially in two consecutive sub-periods of each modulation cycle. In other implementations, the brightness of the illumination light decreases exponentially or changes according to another numerical rule in each modulation cycle.

Average brightness of the illumination light in one modulation cycle is $L_{mean}=(2^n-\frac{1}{2}^m)*L/(m+n)$. A larger quantity of lowest-brightness sub-periods leads to a larger decrease of the average brightness. If the brightness of the illumination light in the second modulation cycle is required to be close to the rated brightness of the light source at the rated current, or the ratio of the average brightness of the varying illumination light in the second modulation cycle to the rated brightness is required to be 0.8 to 1.2, namely, $L_{mean} \approx L$, the control apparatus controls a quantity m of LSBs included in the low-brightness period and a quantity n of LSBs included in the high-brightness period, such that the quantity m and the quantity n meet the following relationship: $2^n - n \approx m + (½^m)$. When m=1, n=2; when m=2, n=2; when m=3; n=3; . . . .

To achieve a bit depth of (m+n), time required to modulate one frame of 2D image is about $(2^{m+n}-1)*t_{LSB}$ in the traditional PWM modulation method, and is only (m+n) $*t_{LSB}$ in the modulation method described in the present disclosure. In other words, in the time for modulating one frame of 2D image in the traditional PWM modulation method, about $(2^{m+n}-1)/(m+n)$ frames can be obtained through modulation in the present disclosure.

Compared with traditional 2D display, the solution in the present disclosure can quickly realize grayscale adjustment in combination with brightness adjustment of the illumination light, and has a high frame rate, which is conducive to emitting projection images from a plurality of angles, so as to realize 3D display.

In an implementation, m=5, n=3, and the second modulation cycle is 8 response time lengths $t_{LSB}$. Assuming that a minimum response time length $t_{LSB}$ is about 22 us, if the solution in this implementation is adopted, a minimum second modulation cycle is about 176 us, and about 5682 frames can be displayed in 1 s. If a frame rate of multi-angle 3D display is set to 60 Hz, the projection display device 100 can obtain 5682/6095 angles through division in each frame for projection display.

Multi-angle image data that is of a stereo image of each pixel and input to the control apparatus 190 may include a plurality of pieces of 2D original image data, and each piece of original image data corresponds to a projection angle. Since a plurality of angles corresponding to input multi-angle image data may be inconsistent with a plurality of projection and emission angles of the projection display device 100, the control apparatus 190 obtains corresponding stereo image data based on the multi-angle original image data of each pixel, and splits each frame of stereo image data based on an algorithm to obtain a 2D image corresponding to each projection angle of the projection display device 100. In each second modulation cycle, the spatial light modulator 150 is configured to modulate the illumination light based on the 2D image corresponding to each projection angle, to obtain image light corresponding to each projection angle.

The control apparatus 190 is further configured to send a deflection control signal, and the projection display device 100 further includes the angle deflection apparatus 170. The angle deflection apparatus 170 is configured to guide, to different spatial angles based on the deflection control signal, a plurality of frames of 2D image light emitted by the spatial light modulator 150 in the first modulation cycle, and the plurality of frames of 2D image light with different spatial angles are projected onto the projection screen, to achieve a 3D display effect relative to human eyes. Brightness adjustment of the illumination light, control performed by a control unit, and adjustment of a spatial angle of emergent light can be synchronously controlled based on the deflection control signal and the light source control signal that are sent by the control apparatus 190 and a control signal of the on/OFF state of the modulation unit.

Figure 5:
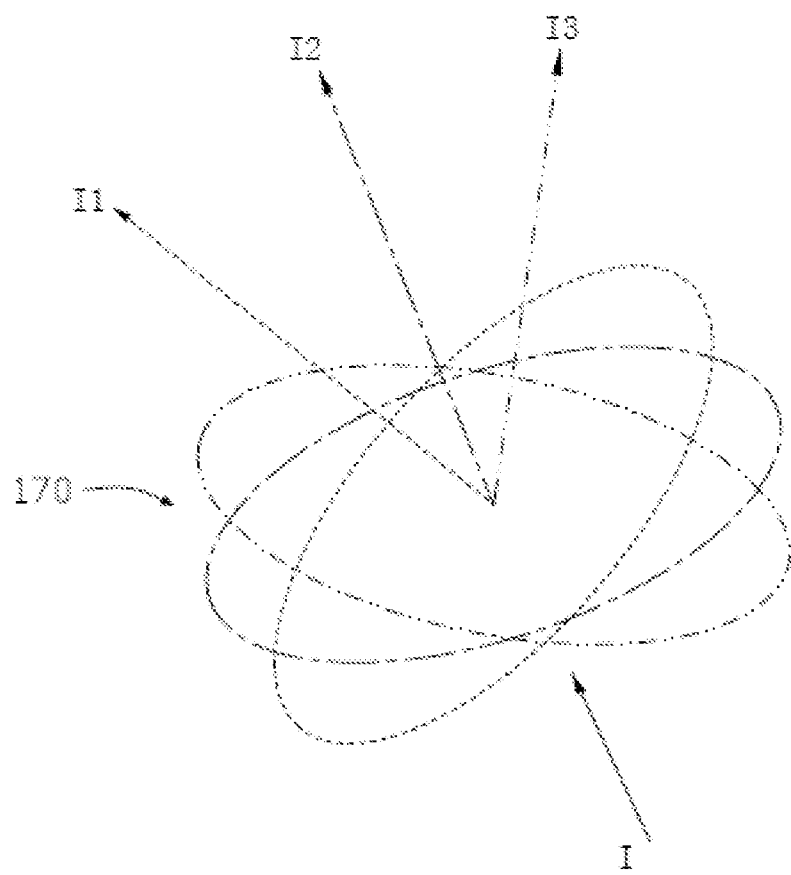
FIG. 5 is a schematic structural diagram of an angle deflection apparatus shown in FIG. 1 in an implementation.

In an embodiment, a steady state of the modulation unit of the spatial light modulator in the second modulation cycle is adjusted, such that different image frames have different spatial angles. As shown in FIG. 5, I1, I2, and I3 are three different steady states of the modulation unit of the spatial light modulator. When the spatial light modulator obtains different 2D images through modulation and emits the 2D images, the modulation unit is in a steady standby state. In each second modulation cycle, the modulation unit has a same steady-state angle, so as to ensure that a complete grayscale image is emitted. For example, in a $1^{st}$ second modulation cycle of the first modulation cycle, the modulation unit is in the I1 state to deflect a 2D image emitted in the cycle to a spatial angle corresponding to the I1 state; in a $2^{nd}$ second modulation cycle of the first modulation cycle, the modulation unit is in the I2 state to deflect a 2D image emitted in the cycle to a spatial angle corresponding to the I2 state; and in a $3^{rd}$ second modulation cycle of the first modulation cycle, the modulation unit is in the I3 state to deflect a 2D image emitted in the cycle to a spatial angle corresponding to the I3 state. It can be understood that a micro electro mechanical system can further be configured to deflect the image light to more than three projection directions in a time division mode.

Figure 6:
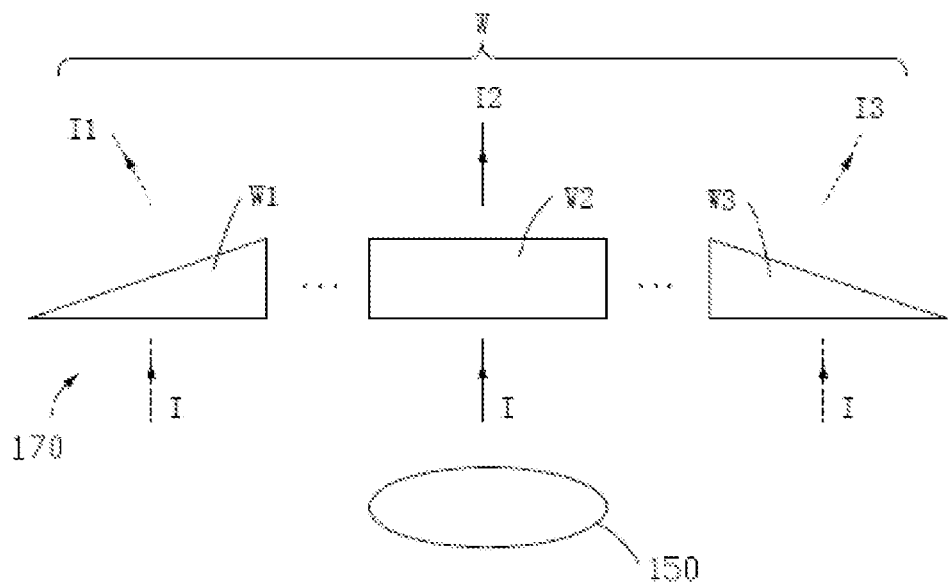
FIG. 6 is a schematic structural diagram of an angle deflection apparatus shown in FIG. 1 in another implementation.

In another embodiment, as shown in FIG. 6, the angle deflection apparatus 170 includes a plurality of guide portions located on an optical path of the image light based on a deflection signal timing, and different guide portions are configured to guide the image light to different projection angles for transmission. As shown in FIG. 6, the angle deflection apparatus 170 is a guide array W. The guide array W is configured to deflect image light I with a same incident angle to different angles and obtain image light I1, I2 and I3 transmitted at different angles. The guide array W includes at least a guide portion W1, a guide portion W2, and a guide portion W3. Each guide portion in the guide array W vibrates repeatedly. In each second modulation cycle, one guide portion in the guide array W is located on the optical path of the image light emitted by the spatial light modulator 150, and is used to refract the image light. Different guide portions are used to refract the incident image light to different deflection angles, and obtain at least image light I1, I2 and I3 transmitted at different deflection angles. In another implementation, the guide array W reflects the image light I to a plurality of deflection angles in the time division mode. In an embodiment, the guide portion may be a designed polygonous scanning lens or the like.

The image light emitted by the angle deflection apparatus 170 at a plurality of different angles is projected onto the projection screen. The projection screen is configured to receive image light with different deflection angles to display a stereo image. In an implementation, the projection screen is an angle-spreading screen to increase an included angle between transmission directions of image light incident at different angles, such that the image light incident at different angles can be separated more widely.

The present disclosure further provides a control method applied to the above projection display device 100. A period in which the projection display device 100 displays one frame of stereo image is referred to as a first modulation cycle, one frame of stereo image is synthesized by a plurality of frames of 2D images transmitted in different directions, and a period in which the projection display device 100 displays one frame of 2D image in one frame of stereo image is referred to as a second modulation cycle. The control method provided in the present disclosure specifically includes the following steps.

S1: Control the light source to emit illumination light.

As shown in FIG. 1, in the present disclosure, the light source 110 is used to emit the illumination light. In each second modulation cycle, the light source 110 controls brightness of the illumination light emitted by the light source 110 to change from first-level brightness to second-level brightness. The first-level brightness is less than the second-level brightness, and both the first-level brightness and the second-level brightness are brightness ranges. In the second modulation cycle, the brightness of the illumination light may be presented as brightness values at a plurality of levels.

Each second modulation cycle includes a low-brightness period and a high-brightness period. The illumination light has the first-level brightness in the low-brightness period, and has the second-level brightness in the high-brightness period. Light brightness of the light source 110 when the light source 110 is continuously driven at its rated current is rated brightness. The brightness of the illumination light in the low-rightness period is controlled to be less than the rated brightness, and the brightness in the high-brightness period is controlled not to be less than the rated brightness.

The light source 110 emits illumination light with different brightness in at least two periods of the second modulation cycle, so as to help shorten the second modulation cycle and improve a frame rate. The brightness of the illumination light in the low-brightness period is less than the rated brightness, and the brightness of the illumination light in the high-brightness period is not less than the rated brightness, so as to improve the frame rate and ensure brightness of image light emitted by the projection display device 100 while ensuring an image contrast.

S2: In the first modulation cycle, control, based on a plurality of frames of 2D images corresponding to one frame of stereo image, the spatial light modulator to modulate the illumination light to obtain image light.

The control apparatus 190 obtains, based on multi-angle 2D original image data of each pixel, data corresponding to one frame of stereo image, and splits the data corresponding to one frame of stereo image to obtain a 2D image corresponding to a spatial angle that can be obtained by the angle deflection apparatus through deflection.

Stereo image data that is of one frame of stereo image of each pixel and input to the control apparatus 190 may include a plurality of frames of 2D original image data, and each frame of original image data corresponds to a projection angle. Since a plurality of angles corresponding to input multi-angle original image data may be inconsistent with a plurality of projection and emission angles of the projection display device 100, the control apparatus 190 obtains the corresponding stereo image data based on the multi-angle 2D original image data of each pixel, or splits received stereo image data based on an algorithm to obtain 2D original image data corresponding to each projection angle of the projection display device 100. The 2D image may correspond to a 2D image of a single base color, such as a red, green, or blue image. A plurality of images of different base colors are synthesized into a color 2D image. In each second modulation cycle, the spatial light modulator 150 is configured to modulate the illumination light based on a 2D image corresponding to each projection angle, to obtain image light corresponding to each projection angle.

In an implementation, the low-brightness period includes m lowest-brightness sub-periods, the high-brightness period includes n highest-brightness sub-periods, and m and n are positive integers. In different sub-periods of each modulation cycle, the light brightness of the light source 110 is controlled to change exponentially. Specifically, the light brightness of the light source is controlled to be $L/2^{m+1-i}$ in an $i^{th}$ low-brightness period, where $1 \le i \le m$, and i is an integer. The light brightness of the light source is controlled to be $L*2^{j-1}$ in a $j^{th}$ low-brightness period, where $1 \le j \le n$, and j is an integer. Correspondingly, the spatial light modulator 150 is controlled to modulate the illumination light by using one data bit in a 2D image of a corresponding pixel in each sub-period, and a time length of each modulation cycle is $(m+n)*t_{LSB}$.

S3: In the first modulation cycle, control the angle deflection apparatus to deflect image light corresponding to different frames of 2D images to different spatial angles.

The present disclosure provides two implementations of the angle deflection apparatus 170. It can be understood that another apparatus not provided in the present disclosure can also be used to realize angle deflection.

S4: Use the screen to receive image light with different deflection angles to display a stereo image.

It should be noted that, within the scope of the spirit or basic features of the present disclosure, the specific solutions in the implementations are mutually applicable, and various implementations in the display apparatus 100 and the control method are mutually applicable. For brevity and in order to avoid repetition, details are not described herein again.

For a person skilled in the art, it is apparent that the present disclosure is not limited to the details of the foregoing exemplary embodiments, and that the present disclosure can be implemented in other specific forms without departing from the spirit or basic features of the present disclosure. Therefore, the embodiments should be regarded as exemplary and non-limiting in every respect, and the scope of the present disclosure is defined by the appended claims rather than the above description. Therefore, all changes falling within the meaning and scope of equivalent elements of the claims should be included in the present disclosure. Any reference numerals in the claims should not be considered as limiting the claims involved. In addition, it is apparent that the word "including" does not exclude other units or steps, and a singular number does not exclude a plural number. A plurality of apparatuses stated in the apparatus claims may also be implemented by a same apparatus or system through software or hardware. The words such as "first" and "second" are used to denote names and do not indicate any particular order.

Finally, it should be noted that the foregoing embodiments are only intended to describe, rather than to limit the technical solutions of the present disclosure.

What is claimed is:

1. A projection display device, wherein a period in which one frame of stereo image is displayed is referred to as a first modulation cycle, and the projection display device comprises:
    a light source, configured to emit illumination light;
    a spatial light modulator, configured to modulate the illumination light based on a plurality of frames of 2D images corresponding to a stereo image to-be-displayed, and sequentially emit, in the first modulation cycle, image light corresponding to the plurality of frames of 2D images;
    an angle deflection apparatus, disposed on an emergent optical path of the image light, and configured to deflect the image light corresponding to the plurality of frames of 2D images to different angles for emission; and
    a projection screen, configured to display the image light deflected by the angle deflection apparatus.

2. The projection display device according to claim 1, wherein
    the first modulation cycle comprises a plurality of second modulation cycles, and the spatial light modulator emits image light of one frame of 2D image in the second modulation cycle;
    the projection display device further comprises a control apparatus, which is configured to control the light source to emit illumination light with varying brightness in the second modulation cycle; and the control apparatus is further configured to control a time length corresponding to a least significant bit (LSB) of the spatial light modulator in the second modulation cycle and an ON status or OFF status of a modulation unit of the spatial light modulator in a time length corresponding to each of the LSB, such that the spatial light modulator is capable of obtaining a specified illumination brightness set through modulation in the second modulation cycle.

3. The projection display device according to claim 2, wherein the second modulation cycle comprises a low-brightness period and a high-brightness period, the light source emits light with first-level brightness in the low-brightness period and emits light with second-level brightness in the high-brightness period, and the first-level brightness is less than the second-level brightness.

4. The projection display device according to claim 3, wherein each of the first-level brightness and the second-level brightness is range brightness; and any brightness of the first-level brightness is less than any brightness of the second-level brightness; or average brightness of the first-level brightness is less than rated brightness of the second-level brightness; or light brightness of the light source when the light source is continuously driven at its rated current is rated brightness, any brightness of the first-level brightness is less than the rated brightness, any brightness of the second-level brightness is not less than the rated brightness, and a difference value between the rated brightness and average brightness of the first-level brightness and the second-level brightness is less than a specified threshold.

5. The projection display device according to claim 3, wherein at least one of the first-level brightness or the second-level brightness changes in a step-like manner, and brightness in each step corresponds to a time length corresponding to at least one LSB.

6. The projection display device according to claim 5, wherein the low-brightness period comprises m LSBs, the high-brightness period comprises n LSBs, m and n are positive integers, and brightness of the illumination light in the low-brightness period satisfies the following formula:

$L_{1i}=L/2^{m+1-i}$, wherein $1 \leq i \leq m$, where i is an integer, and $L_{1i}$ represents brightness of the illumination light corresponding to an $i^{th}$ LSB;

brightness of the illumination light in the high-brightness period satisfies the following formula:

$L_{2j}=L*2^{j-1}$, wherein $1 \leq j \leq n$, where j is an integer, and $L_{2j}$ represents brightness of the illumination light corresponding to a $j^{th}$ LSB; and if the time length corresponding to the LSB is denoted as $t_{LSB}$, then the second modulation cycle satisfies the following formula: $T=(m+n)*t_{LSB}$, where T represents the second modulation cycle.

7. The projection display device according to claim 6, wherein $2^n - n \approx m + (\frac{1}{2}^m)$.

8. The projection display device according to claim 2, wherein the control apparatus is configured to generate a stereo image from a plurality of frames of images of different image formation planes, and then split the stereo image based on an algorithm to obtain 2D images corresponding to different spatial angles; and the angle deflection apparatus is configured to deflect, to a corresponding spatial angle, image light corresponding to any 2D image and emitted by the spatial light modulator.

9. The projection display device according to claim 8, wherein the control apparatus controls, based on a correspondence between the spatial angle and a steady state of the modulation unit, the modulation unit to perform deflection in different steady states when the spatial light modulator modulates different frames of 2D images.

10. The projection display device according to claim 8, wherein the angle deflection apparatus comprises a plurality of guide portions sequentially located on the optical path of the image light in the first modulation cycle, each of the plurality of guide portions is configured to deflect the image light of the 2D image to its associated spatial angle, and each of the plurality of guide portions stays in the optical path for a period of time corresponding to the second modulation cycle.

11. The projection display device according to claim 1, wherein the projection screen is an angle-spreading screen.

12. The projection display device according to claim 4, wherein at least one of the first-level brightness or the second-level brightness changes in a step-like manner, and brightness in each step corresponds to a time length corresponding to at least one LSB.

* * * * *